United States Patent
Lösch et al.

(10) Patent No.: US 8,183,331 B2
(45) Date of Patent: May 22, 2012

(54) REGULATION OF A PROCESS FOR PRODUCING WATER-ABSORBING POLYMER PARTICLES IN A HEATED GAS PHASE

(75) Inventors: Dennis Lösch, Altrip (DE); Marco Krüger, Mannheim (DE); Matthias Weismantel, Jossgrund-Oberndorf (DE); Wilfried Heide, Freinsheim (DE)

(73) Assignee: BASF SE, Ludwigshafen (DE)

( * ) Notice: Subject to any disclaimer, the term of this patent is extended or adjusted under 35 U.S.C. 154(b) by 248 days.

(21) Appl. No.: 12/443,566

(22) PCT Filed: Oct. 29, 2007

(86) PCT No.: PCT/EP2007/061632
§ 371 (c)(1),
(2), (4) Date: Mar. 30, 2009

(87) PCT Pub. No.: WO2008/052971
PCT Pub. Date: May 8, 2008

(65) Prior Publication Data
US 2010/0029866 A1  Feb. 4, 2010

(30) Foreign Application Priority Data

Oct. 31, 2006 (EP) .................... 06123266

(51) Int. Cl.
*C08F 2/00* (2006.01)
*C08F 20/06* (2006.01)
(52) U.S. Cl. ........ 526/61; 526/317.1; 526/922; 526/930
(58) Field of Classification Search .................. 526/88, 526/61, 73, 317.1, 922, 930; 422/109, 145, 422/146
See application file for complete search history.

(56) References Cited

U.S. PATENT DOCUMENTS

| | | | | |
|---|---|---|---|---|
| 2,956,046 | A | * | 10/1960 | Glavis et al. .................. 526/202 |
| 3,644,305 | A | * | 2/1972 | Benot et al. .................... 526/229 |
| 3,813,937 | A | * | 6/1974 | Fletcher et al. ................. 374/34 |
| 4,422,900 | A | * | 12/1983 | Bordelon et al. ............... 159/48.1 |
| 4,816,558 | A | * | 3/1989 | Rauch et al. .................... 528/501 |
| 5,269,980 | A | | 12/1993 | Levendis et al. |
| 2002/0193546 | A1 | | 12/2002 | Freeman et al. |
| 2006/0217508 | A1 | * | 9/2006 | Schmid et al. ............. 526/317.1 |
| 2007/0093531 | A1 | | 4/2007 | Hofgen et al. |
| 2007/0100115 | A1 | | 5/2007 | Schmid et al. |
| 2008/0188586 | A1 | * | 8/2008 | Bruhns et al. ................. 522/153 |
| 2008/0188821 | A1 | | 8/2008 | Losch et al. |

FOREIGN PATENT DOCUMENTS

| | | |
|---|---|---|
| DE | 103 14 466 A1 | 10/2004 |
| DE | 103 40 253 A1 | 3/2005 |
| DE | 10 2004 024 437 A1 | 12/2005 |
| EP | 348 180 A2 | 12/1989 |
| WO | WO-96/40427 A1 | 12/1996 |
| WO | WO-2006/079631 A1 | 8/2006 |
| WO | WO 2006079631 A1 * | 8/2006 |
| WO | WO-2006/120232 A1 | 11/2006 |
| WO | WO-2007/093531 | 8/2007 |

OTHER PUBLICATIONS

Buchholz et al., Modern Superabsorbent Polymer Technology, Wiley-VCH, 71-103 (1998).
International Search Report and Written Opinion in PCT/EP2007/061632 dated Mar. 3, 2008.
German Serial No. 10 2006 001 596.7.

* cited by examiner

*Primary Examiner* — David W Wu
*Assistant Examiner* — Elizabeth Eng
(74) *Attorney, Agent, or Firm* — Marshall, Gerstein & Borun LLP

(57) ABSTRACT

In a process for producing water-absorbing polymeric particles which comprises generating droplets comprising monomers, polymerizing the monomers in a heated gas phase surrounding the droplets and flowing the gas through the polymerization reactor, the temperature of the gas leaving the polymerization reactor is closed-loop controlled.

10 Claims, No Drawings

REGULATION OF A PROCESS FOR PRODUCING WATER-ABSORBING POLYMER PARTICLES IN A HEATED GAS PHASE

CROSS-REFEFENCE TO RELATED APPLICATIONS

This is the U.S. national phase of International Application No. PCT/EP2007/061632, filed Oct. 29, 2007, which claims the benefit of European Patent Application No. 06123266.6, filed Oct. 31, 2006.

DESCRIPTION

The present invention relates to a process for producing water-absorbing polymeric particles which comprises generating droplets comprising monomers, polymerizing the monomers in a heated gas phase surrounding the droplets, flowing the gas through the polymerization reactor, and controlling the temperature of the gas leaving the polymerization reactor by closed-loop control.

The production of water-absorbing polymeric particles is described in the monograph "Modern Superabsorbent Polymer Technology", F. L. Buchholz and A. T. Graham, Wiley-VCH, 1998, pages 71 to 103.

Water-absorbing polymers are used as products capable of absorbing aqueous solutions to manufacture diapers, tampons, sanitary napkins and other hygiene articles, but also as water-retaining agents in market gardening.

Spray polymerization is a way to combine the steps of polymerization and drying. In addition, particle size becomes controllable within certain limits through suitable process management.

The production of water-absorbing polymeric particles by polymerization of droplets of a monomer solution is described for example in EP 348 180 A1, WO 96/40427 A1, U.S. Pat. No. 5,269,980, DE 103 14 466 A1, DE 103 40 253 A1 and DE 10 2004 024 437 A1, WO 2006/077054 A1 and prior German application 102006001596.7 and prior PCT application PCT/EP2006/062252.

It is an object of the present invention to provide an improved process for producing water-absorbing polymeric particles by polymerization of droplets of a monomer solution in a gas phase surrounding the droplets.

More particularly, it is an object of the present invention to provide a process which is less prone to upsets and at the same time generates high-quality products.

We have found that this object is achieved by a process for producing water-absorbing polymeric particles which comprises generating droplets comprising monomers, polymerizing the monomers in a heated gas phase surrounding the droplets and flowing the gas through the polymerization reactor, wherein the temperature of the gas leaving the polymerization reactor is closed-loop controlled.

The temperature of the gas leaving the polymerization reactor is preferably closed-loop controlled via the heating power. Typically, the gas flowing through the reactor is appropriately preheated by means of suitable heat exchangers before entry into the reactor.

In a closed-loop control system, the variable to be controlled, i.e., the controlled variable (actual value), is continuously measured and compared with another variable, the reference variable (set value). Depending on the result of the comparison between the two variables in the closed-loop controller, the manipulated variable resulting from the comparison is used to move the controlled variable closer to the reference variable. In the present invention, the gas exit temperature is the controlled variable and, for example, the heating power is the manipulated variable.

The generated droplets comprise for example
a) at least one ethylenically unsaturated monomer,
b) at least one crosslinker,
c) at least one initiator, and
d) water.

The monomers a) are preferably water soluble, i.e., their solubility in water at 23° C. is typically at least 1 g/100 g of water, preferably at least 5 g/100 g of water, more preferably at least 25 g/100 g of water and most preferably at least 50 g/100 g of water, and preferably each have at least one acid group.

Suitable monomers a) are for example ethylenically unsaturated carboxylic acids, such as acrylic acid, methacrylic acid, maleic acid, fumaric acid and itaconic acid. Acrylic acid and methacrylic acid are particularly preferred monomers. Acrylic acid is most preferable.

Preferred monomers a) have at least one acid group, and the acid groups are preferably in an at least partly neutralized state.

The proportion of total monomers a) accounted for by acrylic acid and/or its salts is preferably at least 50 mol %, more preferably at least 90 mol % and most preferably at least 95 mol %.

The acid groups of the monomers a) are typically in a partly neutralized state, the degree of neutralization preferably being in the range from 25 to 85 mol %, more preferably in the range from 50 to 80 mol % and even more preferably in the range from 60 to 75 mol %. Customary neutralizing agents can be used, preference being given to alkali metal hydroxides, alkali metal oxides, alkali metal carbonates or alkali metal bicarbonates and also mixtures thereof. Instead of alkali metal salts it is also possible to use ammonium salts. Sodium and potassium are particularly preferred as alkali metals, but most preference is given to sodium hydroxide, sodium carbonate or sodium bicarbonate and also mixtures thereof. Neutralization is customarily achieved by admixing the neutralizing agent as an aqueous solution, as a melt or else preferably as a solid material. For example, sodium hydroxide having a water content of distinctly below 50% by weight can be present as a waxy mass having a melting point of above 23° C. In this case, metering as pieces or melt at elevated temperature is possible.

The monomers a) and especially acrylic acid comprise preferably up to 0.025% by weight of a hydroquinone half ether. Preferred hydroquinone half ethers are hydroquinone monomethyl ether (MEHQ) and/or tocopherols.

Tocopherol refers to compounds of the following formula:

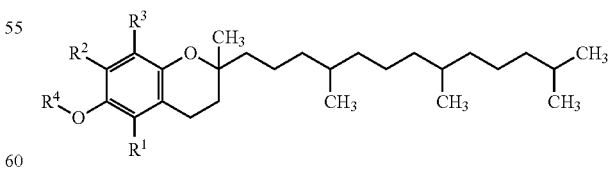

where $R^1$ is hydrogen or methyl, $R^2$ is hydrogen or methyl, $R^3$ is hydrogen or methyl and $R^4$ is hydrogen or an acyl radical of 1 to 20 carbon atoms.

Preferred $R^4$ radicals are acetyl, ascorbyl, succinyl, nicotinyl and other physiologically tolerable carboxylic acids. The carboxylic acids can be mono-, di- or tricarboxylic acids.

Preference is given to alpha-tocopherol where $R^1=R^2=R^3=$methyl, especially racemic alpha-tocopherol. $R^1$ is more preferably hydrogen or acetyl. RRR-alpha-tocopherol is preferred in particular.

The monomer solution comprises preferably not more than 160 weight ppm, more preferably not more than 130 weight ppm, preferably not more than 70 weight ppm, preferably not less than 10 weight ppm, more preferably not less than 30 weight ppm and especially about 50 weight ppm of hydroquinone half ether, all based on acrylic acid, with acrylic acid salts being counted as acrylic acid. For example, the monomer solution can be produced using an acrylic acid having an appropriate hydroquinone half ether content.

Crosslinkers b) are compounds having at least two polymerizable groups which can be free-radically interpolymerized into the polymer network. Suitable crosslinkers b) are for example ethylene glycol dimethacrylate, diethylene glycol diacrylate, allyl methacrylate, trimethylolpropane triacrylate, triallylamine, tetraallyloxyethane, as described in EP 530 438 A1, di- and triacrylates, as described in EP 547 847 A1, EP 559 476 A1, EP 632 068 A1, WO 93/21237 A1, WO 2003/104299 A1, WO 2003/104300 A1, WO 2003/104301 A1 and DE 103 31 450 A1, mixed acrylates which, as well as acrylate groups, comprise further ethylenically unsaturated groups, as described in DE 103 31 456 A1 and DE 103 55 401 A1, or crosslinker mixtures as described for example in DE 195 43 368 A1, DE 196 46 484 A1, WO 90/15830 A1 and WO 2002/32962 A2.

Useful crosslinkers b) include in particular N,N'-methylenebisacrylamide and N,N'-methylenebismethacrylamide, esters of unsaturated mono- or polycarboxylic acids of polyols, such as diacrylate or triacrylate, for example butanediol diacrylate, butanediol dimethacrylate, ethylene glycol diacrylate, ethylene glycol dimethacrylate and also trimethylolpropane triacrylate and allyl compounds, such as allyl (meth)acrylate, triallyl cyanurate, diallyl maleate, polyallyl esters, tetraallyloxyethane, triallylamine, tetraallylethylenediamine, allyl esters of phosphoric acid and also vinylphosphonic acid derivatives as described for example in EP 343 427 A2. Useful crosslinkers b) further include pentaerythritol diallyl ether, pentaerythritol triallyl ether, pentaerythritol tetraallyl ether, polyethylene glycol diallyl ether, ethylene glycol diallyl ether, glycerol diallyl ether, glycerol triallyl ether, polyallyl ethers based on sorbitol, and also ethoxylated variants thereof. The process of the invention utilizes di(meth)-acrylates of polyethylene glycols, the polyethylene glycol used having a molecular weight between 300 and 1000.

However, particularly advantageous crosslinkers b) are di- and triacrylates of 3- to 20-tuply ethoxylated glycerol, of 3- to 20-tuply ethoxylated trimethylolpropane, of 3- to 20-tuply ethoxylated trimethylolethane, especially di- and triacrylates of 2- to 6-tuply ethoxylated glycerol or of 2- to 6-tuply ethoxylated trimethylolpropane, of 3-tuply propoxylated glycerol, of 3-tuply propoxylated trimethylolpropane, and also of 3-tuply mixedly ethoxylated or propoxylated glycerol, of 3-tuply mixedly ethoxylated or propoxylated trimethylolpropane, of 15-tuply ethoxylated glycerol, of 15-tuply ethoxylated trimethylolpropane, of at least 40-tuply ethoxylated glycerol, of 40-tuply ethoxylated trimethylolethane and also of 40-tuply ethoxylated trimethylolpropane.

Very particularly preferred for use as crosslinkers b) are diacrylated, dimethacrylated, triacrylated or trimethacrylated multiply ethoxylated and/or propoxylated glycerols as described for example in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. The triacrylates of 3- to 5-tuply ethoxylated and/or propoxylated glycerol are most preferred.

The amount of crosslinker b) in the monomer solution is preferably at least 0.2% by weight, more preferably at least 0.4% by weight, even more preferably at least 0.6% by weight and most preferably at least 0.8% by weight, all based on monomer a).

Useful initiators c) include all compounds that disintegrate into free radicals under the polymerization conditions, examples being peroxides, hydroperoxides, hydrogen peroxide, persulfates, azo compounds and the so-called redox initiators. The use of water-soluble initiators is preferred. In some cases, it is advantageous to use mixtures of various initiators, for example mixtures of hydrogen peroxide and sodium peroxo-disulfate or potassium peroxodisulfate. Mixtures of hydrogen peroxide and sodium peroxodisulfate can be used in any proportion.

Particularly preferred initiators c) are azo initiators, such as 2,2'-azobis[2-(2-imidazolin-2-yl)propane] dihydrochloride and 2,2'-azobis[2-(5-methyl-2-imidazolin-2-yl)propane] dihydrochloride, and photoinitiators, such as 2-hydroxy-2-methylpropiophenone and 1-[4-(2-hydroxyethoxy)phenyl]-2-hydroxy-2-methyl-1-propan-1-one, redox initiators, such as sodium persulfate/hydroxymethylsulfinic acid, ammonium peroxodisulfate/hydroxymethylsulfinic acid, hydrogen peroxide/hydroxymethylsulfinic acid, sodium persulfate/ascorbic acid, ammonium peroxodisulfate/ascorbic acid and hydrogen peroxide/ascorbic acid, photoinitiators, such as 1-[4-(2-hydroxyethoxy)phenyl]-2-hydroxy-2-methyl-1-propan-1-one, and also mixtures thereof.

The initiators are used in customary amounts, for example in amounts from 0.001% to 5% by weight and preferably from 0.01% to 1% by weight, based on the monomers a).

The polymerization inhibitors can also be removed by absorption, for example on activated carbon.

The solids content of the monomer solution is preferably at least 35% by weight, more preferably at least 38% by weight, even more preferably at least 40% by weight and most preferably at least 42% by weight. Solids content refers to the sum total of all constituents nonvolatile after the polymerization. These constituents are monomer a), crosslinker b) and initiator c).

The oxygen content of the monomer solution is preferably at least 1 weight ppm, more preferably at least 2 weight ppm, more preferably at least 5 weight ppm. The customary inertization of the monomer solution can therefore be substantially dispensed with.

The elevated oxygen content stabilizes the monomer solution and facilitates the use of smaller amounts of polymerization inhibitor and thereby reduces the product discolorations due to the polymerization inhibitor.

The monomer solution is metered into the gas phase for polymerization. The oxygen content of the gas phase is preferably in the range from 0.001% to 0.15% by volume, more preferably in the range from 0.002% to 0.1% by volume and most preferably in the range from 0.005% to 0.05% by volume.

Besides oxygen, the gas phase preferably only comprises inert gases, i.e., gases which do not interfere in the polymerization under reaction conditions, examples being nitrogen and/or water vapor.

The monomer solution is metered into the gas phase via forming droplets. The droplets can be generated using a dropletizer plate for example.

A dropletizer plate is a plate having at least one drilled hole, the liquid passing downwardly through the drilled hole. The dropletizer plate or liquid can be oscillated, the abrasion generating, on the underside of the dropletizer plate, one ideally monodisperse chain of droplets per drilled hole. In a preferred embodiment, the dropletizer plate is not oscillated or vibrated.

The number and the size of the drilled holes are chosen according to the desired capacity and droplet size. Droplet diameter is typically 1.9 times the diameter of the drilled hole. It is important that the liquid to be dropletized does not pass through the drilled hole too quickly and that the pressure drop over the drilled hole is not too great. Otherwise, the liquid is not dropletized, but rather the jet of liquid is torn apart (sprayed) owing to the high kinetic energy. The dropletizer is operated in the flow range of laminar jet disintegration, i.e., the Reynolds number based on the throughput per drilled hole and the drilled hole diameter is preferably less than 2000, more preferably less than 1000, even more preferably less than 500 and most preferably less than 100. The pressure drop over the drilled hole is preferably less than 2.5 bar, more preferably less than 1.5 bar and most preferably less than 1 bar.

The dropletizer plate has typically at least one, preferably at least 10, more preferably at least 50 and typically up to 10 000, preferably up to 5000 and more preferably up to 1000 drilled holes, the drilled holes typically being distributed uniformly over the dropletizer plate, preferably in a so-called triangular pitch, i.e., three drilled holes at a time form the corners of an equilateral triangle. The diameter of the drilled holes is adapted to the desired droplet size.

However, the droplets can also be generated by means of pneumatic drawing dies, rotation, chopping up of a jet or rapid response microvalve dies.

In a pneumatic drawing die, a jet of liquid is accelerated through a hole diaphragm together with a gas stream. The gas rate can be used to influence the diameter of the jet of liquid and hence the droplet diameter.

In the case of droplet generation by rotation, the liquid passes through the orifices of a rotating disk. As a result of the centrifugal force acting on the liquid, droplets of defined size are torn off. Preferred apparatus for rotation dropletization is described for example in DE 43 08 842 A1.

The emerging jet of liquid, however, can also be cut into defined segments by means of a rotating blade. Each segment then forms a droplet.

In the case of microvalve dies, droplets of defined liquid volume are generated directly.

The generated droplets have an average diameter of preferably at least 200 µm, more preferably at least 250 µm and most preferably at least 300 µm, the droplet diameter being determinable by light scattering and being the volume average diameter.

The polymerization reactor is traversed by a gas flow. The carrier gas can be conducted through the reaction space cocurrently with or countercurrently to the free-falling droplets of the monomer solution, preferably cocurrently, i.e., upwardly. Preferably, after one pass, the gas is at least partly returned as cycle gas into the reaction space, preferably to an extent of at least 50% and more preferably to an extent of at least 75%. Typically, a proportion of the carrier gas is moved from the system after each pass, the proportion being preferably up to 10%, more preferably up to 3% and most preferably up to 1%.

The polymerization is preferably carried out in a laminar gas flow. A laminar gas flow is a gas flow in which the individual layers of the flow do not mix but rather move in parallel. A measure of the flow conditions is the Reynolds number (Re). Below a critical Reynolds number ($Re_{crit}$) of 2300, a gas flow is laminar. The Reynolds number of the laminar gas flow is preferably less than 2000, more preferably less than 1500 and most preferably less than 1000. The lower limiting case for the laminar inert gas flow is a quiescent inert gas atmosphere (Re=0), i.e., there is no continuous feeding of inert gas.

The gas velocity is preferably adjusted such that the flow in the polymerization reactor is directed in that, for example, there are no convection currents opposed to the general direction of flow, and is for example in the range from 0.01 to 5 m/s, preferably in the range from 0.02 to 4 m/s, more preferably in the range from 0.05 to 3 m/s and most preferably in the range from 0.1 to 2 m/s.

The gas flowing through the reactor is advantageously preheated to the reaction temperature upstream of the reactor.

The reaction temperature in the case of the thermally induced polymerization is preferably in the range from 70 to 250° C., more preferably in the range from 100 to 220° C. and most preferably in the range from 120 to 200° C.

The reaction can be carried out under elevated pressure or under reduced pressure; a reduced pressure of up to 100 mbar below ambient is preferred.

The reaction offgas, i.e., the gas leaving the reaction space, can be cooled down in a heat exchanger for example. Water and unconverted monomer a) condense in the process. Thereafter, the reaction offgas can be at least partly reheated and returned into the reactor as cycle gas. A proportion of the reaction offgas can be removed from the system and be replaced by a fresh gas, in which case water and unconverted monomers a) present in the reaction offgas can be separated off and recycled.

A thermally integrated system is particularly preferred in that a portion of the waste heat in the cooling of the offgas is used to heat the cycle gas.

The reactors can be trace heated. In this case, the trace heating is adjusted such that the wall temperature is at least 5° C. above the internal reactor temperature and condensation on the reactor walls is reliably prevented.

The reaction product can be withdrawn from the reactor in a customary manner, for example at the bottom via a conveying screw, and selectively dried to the desired residual moisture content and to the desired residual monomer content.

The reaction product is preferably dried in at least one fluidized bed.

The polymeric particles can be postcrosslinked to further improve their properties.

Postcrosslinkers are compounds comprising two or more groups capable of forming covalent bonds with carboxylate groups of the hydrogel. Suitable compounds are for example alkoxysilyl compounds, polyaziridines, polyamines, polyamidoamines, di- or poly epoxides, as described in EP 83 022 A2, EP 543 303 A1 and EP 937 736 A2, di- or polyfunctional alcohols, as described in DE 33 14 019 A1, DE 35 23 617 A1 and EP 450 922 A2, or β-hydroxyalkylamides, as described in DE 102 04 938 A1 and U.S. Pat. No. 6,239,230.

Useful postcrosslinkers are further said to include by DE 40 20 780 C1 cyclic carbonates, by DE 198 07 502 A1 2-oxazolidone and its derivatives, such as 2-hydroxyethyl-2-oxazolidone, by DE 198 07 992 C1 bis- and poly-2-oxazolidinones, by DE 198 54 573 A1 2-oxotetrahydro-1,3-oxazine and its derivatives, by DE 198 54 574 A1 N-acyl-2-oxazolidones, by DE 102 04 937 A1 cyclic ureas, by DE 103 34 584 A1 bicyclic amide acetals, by EP1 199 327 A2 oxetanes and cyclic ureas and by WO 2003/31482 A1 morpholine-2,3-dione and its derivatives.

The amount of postcrosslinker is preferably in the range from 0.01% to 1% by weight, more preferably in the range from 0.05% to 0.5% by weight and most preferably in the range from 0.1% to 0.2% by weight, all based on the polymer.

Postcrosslinking is typically carried out by spraying a solution of the postcrosslinker onto the hydrogel or onto the dried polymeric particles. After spraying, the polymeric particles are thermally dried, and the postcrosslinking reaction may take place not only before but also during drying.

The spraying with a solution of the crosslinker is preferably carried out in mixers having moving mixing implements, such as screw mixers, paddle mixers, disk mixers, plowshare mixers and shovel mixers. Particular preference is given to vertical mixers and very particular preference to plowshare mixers and shovel mixers. Useful mixers include for example Lödige mixers, Bepex mixers, Nauta mixers, Processall mixers and Schugi mixers.

Contact dryers are preferable, shovel dryers more preferable and disk dryers most preferable as apparatus in which thermal drying is carried out. Useful dryers include for example Bepex dryers and Nara dryers. Fluidized bed dryers can be used as well.

Drying may take place in the mixer itself, by heating the jacket or introducing a stream of warm air. It is similarly possible to use a downstream dryer, for example a tray dryer, a rotary tube oven or a heatable screw. It is particularly advantageous to mix and dry in a fluidized bed dryer.

Preferred drying temperatures range from 170 to 250° C., preferably from 180 to 220° C. and more preferably from 190 to 210° C. The preferred residence time at this temperature in the reaction mixer or dryer is preferably at least 10 minutes, more preferably at least 20 minutes and most preferably at least 30 minutes.

The process of the present invention provides for the production of water-absorbing polymeric particles of consistent quality.

The water-absorbing polymeric particles obtainable according to the process of the present invention have a Centrifuge Retention Capacity (CRC) of typically at least 20 g/g, preferably at least 25 g/g, more preferably at least 30 g/g, even more preferably at least 32 g/g and most preferably at least 34 g/g. The centrifuge retention capacity (CRC) of the water-absorbing polymeric particles is typically less than 50 g/g.

The water-absorbing polymeric particles obtainable according to the process of the present invention have an extractables content of typically less than 15% by weight, preferably less than 10% by weight, more preferably less than 5% by weight, even more preferably less than 4% by weight and most preferably less than 3% by weight.

The water-absorbing polymeric particles obtainable according to the process of the present invention have a residual monomer content of typically less than 15% by weight, preferably less than 10% by weight, more preferably less than 5% by weight, even more preferably less than 4% by weight and most preferably less than 3% by weight.

The average diameter of the water-absorbing polymeric particles obtainable according to the process of the present invention is preferably at least 200 μm, more preferably in the range from 250 to 600 μm and most preferably in the range from 300 to 500 μm, the particle diameter being determinable by light scattering and being the volume average diameter. 90% of the polymeric particles have a diameter of preferably 100 to 800 μm, more preferably of 150 to 700 μm and most preferably of 200 to 600 μm.

The water-absorbing polymeric particles are tested using the test methods described hereinbelow.

Methods:

Centrifuge Retention Capacity (CRC Centrifuge Retention Capacity)

Centrifuge retention capacity of the water-absorbing polymeric particles is determined in accordance with EDANA (European Disposables and Nonwovens Association) recommended test method No. 441.2-02 "Centrifuge retention capacity".

Absorbency Under Load (AUL0.3 psi)

Absorbency under load of the water-absorbing polymeric particles is determined in accordance with EDANA (European Disposables and Nonwovens Association) recommended test method No. 442.2-02 "Absorption under pressure".

Water Content

The water content of the water-absorbing polymeric particles was determined via the weight loss at 120° C.

EDANA test methods are obtainable for example from European Disposables and Nonwovens Association, Avenue Eugéne Plasky 157, B-1030 Brussels, Belgium.

EXAMPLES

Examples 1 to 3

14.3 kg of sodium acrylate (37.5% by weight solution in water), 1.4 kg of acrylic acid and 350 g of water were mixed with 22 g of 15-tuply ethoxylated trimethylolpropane triacrylate. The initiator used was a 3% by weight solution of 2,2'-azobis[2-(2-imidazolin-2-yl)propane] dihydrochloride in water. The initiator was metered into the monomer solution, via a static mixer, upstream of a dropletizer. The dropletizer plate had 30 drilled holes each 200 μm in size. The ratio of monomer solution to initiator solution was 93.6:6.4. The mixture obtained was dropletized in a heated dropletization tower filled with nitrogen atmosphere (12 m height, 2 m width, gas velocity 0.1 m/s in cocurrent). The metering rate of the mixture was in the range from 16 to 26 kg/h. The heating power of the gas preheat was closed-loop controlled such that the gas inlet temperature ($T_{in}$) into the dropletization tower was a constant 180° C. The nitrogen feed rate was 1000 m³/h.

The experimental results are summarized in Table 1.

Examples 4 to 6

14.3 kg of sodium acrylate (37.5% by weight solution in water), 1.4 kg of acrylic acid and 350 g of water were mixed with 22 g of 15-tuply ethoxylated trimethylolpropane triacrylate. The initiator used was a 3% by weight solution of 2,2'-azobis[2-(2-imidazolin-2-yl)propane] dihydrochloride in water. The initiator was metered into the monomer solution, via a static mixer, upstream of a dropletizer. The dropletizer plate had 30 drilled holes each 200 μm in size. The ratio of monomer solution to initiator solution was 93.6:6.4. The mixture obtained was dropletized in a heated dropletization tower filled with nitrogen atmosphere (12 m height, 2 m width, gas velocity 0.1 m/s in cocurrent). The metering rate of the mixture was in the range from 16 to 26 kg/h. The heating power of the gas preheat was closed-loop controlled such that the gas outlet temperature ($T_{out}$) out of the dropletization tower was a constant of 130° C. The nitrogen feed rate was 1000 m³h.

The experimental results are summarized in Table 1.

TABLE 1

| | | | Experimental results | | | |
|---|---|---|---|---|---|---|
| Example | Metering rate [kg/h] | $T_{in}$ [°C.] | $T_{out}$ [°C.] | Water content [% by wt.] | CRC [g/g] | AUL0.3 psi [g/g] |
| 1*) | 16 | 180 | 144 | 10 | 38.8 | 21.0 |
| 2*) | 20 | 180 | 141 | 11 | 37.6 | 24.4 |
| 3*) | 26 | 180 | 137 | 13 | 35.3 | 29.8 |
| 4 | 16 | 162 | 130 | 12 | 34.7 | 31.2 |
| 5 | 20 | 166 | 130 | 13 | 33.9 | 30.5 |
| 6 | 26 | 168 | 130 | 15 | 35.1 | 30.8 |

*)comparative example

The results show that load changes in the case when the gas inlet temperature is subjected to closed-loop control lead to appreciable changes in the absorbency under load of the polymeric particles obtained. This undesirable effect disappears when the gas outlet temperature is closed-loop controlled instead.

We claim:

1. A process for producing water-absorbing polymeric particles which comprises generating droplets comprising monomers, polymerizing the monomers in a heated gas phase surrounding the droplets and flowing a gas through a polymerization reactor, wherein a temperature of the gas leaving the polymerization reactor is closed-loop controlled to provide a constant gas outlet temperature.

2. The process according to claim 1 wherein the temperature is closed-loop controlled via a heating power.

3. The process according to claim 1 wherein the gas flows downwardly through the polymerization reactor.

4. The process according to claim 1 wherein the droplets have an average diameter of at least 200 μm.

5. The process according to claim 1 wherein the droplets comprise
  a) at least one ethylenically unsaturated monomer,
  b) at least one crosslinker,
  c) at least one initiator, and
  d) water.

6. The process according to claim 1 wherein the monomer has at least one acid group.

7. The process according to claim 6 wherein the acid groups of the monomer are in an at least partly neutralized state.

8. The process according to claim 1 wherein at least 50 mol % of the monomers is acrylic acid.

9. The process according to claim 1 wherein the polymeric particles obtained are dried in at least one further process step.

10. The process according to claim 9 wherein the polymeric particles obtained are dried in at least one fluidized bed.

* * * * *